United States Patent
Soni et al.

(10) Patent No.: US 10,734,024 B1
(45) Date of Patent: Aug. 4, 2020

(54) SYSTEMS AND METHODS OF APPENDING METADATA TO A MEDIA FILE FOR PLAYING TIME-LAPSED AUDIO

(71) Applicant: ADOBE INC., San Jose, CA (US)

(72) Inventors: Sachin Soni, New Delhi (IN); Amit Srivastava, Noida (IN); Ajay Jain, Ghaziabad (IN); Abhishek Jain, Delhi (IN)

(73) Assignee: Adobe, Inc., San Jose, CA (US)

( * ) Notice: Subject to any disclaimer, the term of this patent is extended or adjusted under 35 U.S.C. 154(b) by 0 days.

(21) Appl. No.: 16/121,445

(22) Filed: Sep. 4, 2018

(51) Int. Cl.
*H04N 9/80* (2006.01)
*G11B 27/00* (2006.01)
*G11B 27/10* (2006.01)
*G06F 40/284* (2020.01)
*H04N 5/783* (2006.01)

(52) U.S. Cl.
CPC .......... *G11B 27/005* (2013.01); *G06F 40/284* (2020.01); *G11B 27/10* (2013.01)

(58) Field of Classification Search
USPC ................................................ 386/343, 248
See application file for complete search history.

(56) References Cited

U.S. PATENT DOCUMENTS

| | | | |
|---|---|---|---|
| 6,345,252 B1* | 2/2002 | Beigi | G10L 15/26 704/272 |
| 2002/0051081 A1* | 5/2002 | Hori | G11B 27/005 348/553 |
| 2005/0185924 A1* | 8/2005 | Hagiwara | G11B 27/005 386/297 |
| 2006/0143559 A1* | 6/2006 | Spielberg | G06F 3/165 715/201 |
| 2009/0022472 A1* | 1/2009 | Bronstein | G06K 9/00751 386/278 |
| 2010/0220974 A1* | 9/2010 | Yamashita | G11B 27/005 386/344 |
| 2014/0078916 A1* | 3/2014 | Kjeldaas | H04L 65/1083 370/252 |
| 2016/0041949 A1* | 2/2016 | Gluck | G06F 40/117 715/256 |
| 2018/0068643 A1* | 3/2018 | Ishioka | G10H 1/0033 |
| 2018/0365560 A1* | 12/2018 | Qiao | G06N 3/08 |

* cited by examiner

*Primary Examiner* — Nigar Chowdhury
(74) *Attorney, Agent, or Firm* — Shook, Hardy & Bacon, L.L.P.

(57) ABSTRACT

A media player may receive an instruction to advance the media file content a higher than normal speed. At least a portion of the associated metadata may be accessed to retrieve a location of a group of words determined to be the most important in a portion of the media file content being advanced at the higher than normal speed. Audio content of the group of the most important words may be played at a normal speed while advancing the media file at a higher than normal speed.

20 Claims, 15 Drawing Sheets

|     | S1 | S2   | S3   | S4   | S5   | S6   | S7   | S8   | S9   | S10  | S11  | ... | ... | ... |
| --- | -- | ---- | ---- | ---- | ---- | ---- | ---- | ---- | ---- | ---- | ---- | --- | --- | --- |
| S1  | X  | 0.50 | 0.66 | 0.64 | 0.48 | 0.38 | 0.37 | 0.24 | 0.41 | 0.41 | 0    | ... | ... | ... |
| S2  |    | X    | 0.50 | 0.93 | 0.80 | 0.63 | 0.80 | 0.26 | 0.45 | 0.67 | 0.21 | ... | ... | ... |
| S3  |    |      | X    | 0.64 | 0.48 | 0.19 | 0.37 | 0.24 | 0.20 | 0.41 | 0.19 | ... | ... | ... |
| S4  |    |      |      | X    | 0.67 | 0.36 | 0.52 | 0.45 | 0.39 | 0.56 | 0.18 | ... | ... | ... |
| S5  |    |      |      |      | X    | 0.81 | 0.97 | 0.25 | 0.43 | 0.65 | 0.30 | ... | ... | ... |
| S6  |    |      |      |      |      | X    | 0.65 | 0    | 0.53 | 0.35 | 0.17 | ... | ... | ... |
| S7  |    |      |      |      |      |      | X    | 0.19 | 0.34 | 0.52 | 0.16 | ... | ... | ... |
| S8  |    |      |      |      |      |      |      | X    | 0.21 | 0.21 | 0.20 | ... | ... | ... |
| S9  |    |      |      |      |      |      |      |      | X    | 0.56 | 0.54 | ... | ... | ... |
| S10 |    |      |      |      |      |      |      |      |      | X    | 0.36 | ... | ... | ... |
| S11 |    |      |      |      |      |      |      |      |      |      | X    | ... | ... | ... |
| ... |    |      |      |      |      |      |      |      |      |      |      | X   | ... | ... |
| ... |    |      |      |      |      |      |      |      |      |      |      |     | X   | ... |

| Iterations \ Sentences | S1 | S2 | S3 | S4 | S5 | S6 | S7 | S8 | S9 | S10 | S11 | . | . |
|---|---|---|---|---|---|---|---|---|---|---|---|---|---|
| 1 | 3.2 | 4.9 | 3.3 | 4.4 | 4.5 | 3.2 | 3.3 | 1.6 | 2.9 | 2.9 | 1.2 | . | . |
| 2 | 2.2 | 2.9 | 1.9 | 2.3 | 2.4 | 1.7 | 1.8 | 0.9 | 1.4 | 1.5 | 0.7 | . | . |
| 3 | 1.3 | 1.6 | 1.1 | 1.3 | 1.4 | 1 | 1.1 | 0.5 | 0.9 | 0.9 | 0.5 | . | . |
| . | . | . | . | . | . | . | . | . | . | . | . | . | . |
| . | . | . | . | . | . | . | . | . | . | . | . | . | . |
| . | . | . | . | . | . | . | . | . | . | . | . | . | . |
| . | . | . | . | . | . | . | . | . | . | . | . | . | . |
| 12 | 0.42 | 0.53 | 0.41 | 0.52 | 0.54 | 0.43 | 0.49 | 0.30 | 0.43 | 0.47 | 0.30 | . | . |
| 13 | 0.42 | 0.53 | 0.41 | 0.51 | 0.54 | 0.433 | 0.49 | 0.30 | 0.43 | 0.47 | 0.30 | . | . |

| Sentences / Iterations | S1 | S2 | S3 | S4 | S5 | S6 | S7 | S8 | S9 | S10 |
|---|---|---|---|---|---|---|---|---|---|---|
| 1 | 4.5 | 3.8 | 3.1 | 3.8 | 4.94 | 4.3 | 1.7 | 1.8 | 3.3 | 2.8 |
| 2 | 2.4 | 2.27 | 1.78 | 2.09 | 2.78 | 2.2 | 1.9 | 0.9 | 1.61 | 1.29 |
| 3 | 1.3 | 1.3 | 1.04 | 1.23 | 1.57 | 1.2 | 1.18 | 0.6 | 0.95 | 0.57 |
| . | . | . | . | . | . | . | . | . | . | . |
| . | . | . | . | . | . | . | . | . | . | . |
| . | . | . | . | . | . | . | . | . | . | . |
| . | . | . | . | . | . | . | . | . | . | . |
| 7 | 0.41 | 0.52 | 0.41 | 0.52 | 0.54 | 0.43 | 0.49 | 0.30 | 0.41 | 0.42 |
| 8 | 0.41 | 0.52 | 0.41 | 0.52 | 0.54 | 0.43 | 0.49 | 0.30 | 0.41 | 0.42 |

| Sentence# | Final score |
|---|---|
| 1 | 0.28 |
| 2 | 0.29 |
| 3 | 0.31 |
| 4 | 0.30 |
| 5 | 0.30 |
| 6 | 0.30 |
| 7 | 0.30 |
| 8 | 0.30 |
| 9 | 0.42 |
| 10 | 0.43 |
| 11 | 0.29 |
| ... | ... |
| ... | ... |

624a → row 1

| Start Time (Seconds) | End Time (Seconds) | Textual Content | Sentence Rank |
|---|---|---|---|
| 6 | 10 | And finally we look at the 6 And at that point we are done. | 427 |
| 10 | 12 | We're going to get started. | 141 |
| 12 | 16 | Handouts are the by the door if anybody didn't pick one up. | 392 |
| 16 | 18 | My name is Charles Leiserson. | 646 |
| 18 | 25 | I will be lecturing this course this term, Introduction to Algorithms, with Erik Demaine | 69 |
| 25 | 35 | In addition, this is an SMA course, a Singapore MIT Alliance course which will be run in Singapore by David Hsu. | 201 |
| 35 | 49 | And so all the lectures will be videotaped and made available on the Web for the Singapore students, as well as for MIT students who choose to watch them on the Web. | 245 |
| ... | ... | ... | ... |
| 4838 | 4837 | Because we are going to be going through a bunch of the things that I have left on the table here. | 293 |
| 4837 | 4839 | And see you next Monday. | 635 |

700

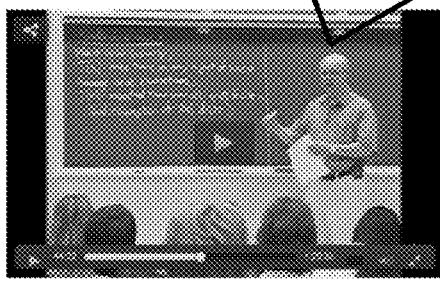

SYSTEMS AND METHODS OF APPENDING METADATA TO A MEDIA FILE FOR PLAYING TIME-LAPSED AUDIO

TECHNICAL FIELD

This application relates generally to processing media files, and more specifically to appending metadata to a media file such that a media player may access the metadata to play audio while advancing media file content at a higher-than-normal speed.

BACKGROUND

Media files—such as audio or video files—containing movies, on demand training sessions, and recorded webinars are generally very lengthy. A user playing video/audio content from the media files may have to fast forward the video/audio to skip the content that is not relevant or already known to the user. Furthermore, the user may have to rewind portions of video/audio to watch/listen more important or interesting content. In other words, the user may have to advance the content of the media files at a higher than normal speed for various reasons.

A technical shortcoming in conventional media players is that there is no mechanism for an audio preview of content being advanced at higher than normal speed, which may pose a severe disadvantage to visually impaired users. A media player may show video frames at a higher than normal speed when the user instructs the media player to fast forward/rewind the video. A user with normal vision may observe the video frames shown at higher than normal speed to determine whether to resume the video playback at normal speed. The conventional cue for resuming normal playback speed for video is therefore visual. A blind or a visually impaired person who instructs a media player to advance video content at a higher than normal speed will not see speeding video frames to decide whether to resume normal playback. One solution for a visually impaired person to preview content being skipped is to advance the audio at a higher than normal speed along with the video. However, the audio being played at a higher than normal speed may be garbled and not intelligible. Similarly, advancing audio content at higher than normal speed poses a similar problem (e.g., garbled) for all users, regardless of visual impairment.

SUMMARY

What is therefore desired is a technical solution to play important portions of audio from media file content being advanced at a higher than normal speed such that a user, visually impaired or otherwise, may have an audio cue to resume normal playback. What is further desired are systems and methods that process the media file content to append metadata that a media player can extract and employ to play important portions of the audio (e.g., individual sentences determined to be important within the media file content) at normal playback speed while advancing media file content at a higher than normal speed.

Embodiments of the technical solution disclosed herein may append metadata to a media file for a media player to use to play audio at normal playback speed (or simply, normal speed) when advancing the media file content itself at higher than the normal playback speed. As used herein, advancing may include advancing the media file content in any direction, i.e., forward (e.g., fast forwarding) or reverse (e.g., rewinding). In an illustrative embodiment, a computer may receive a media file of audio and/or video content, and generate a subtitle file including uttered sentences (or any other grouping of words) from the media file. From each sentence, the computer may remove stop words, such as articles and conjunctions and prepositions, and stem the remaining words to their root forms, for example, reducing "went" to "go." In other words, the computer may reduce each sentence into tokens of root words and generate a token vector for each sentence. The computer may calculate pairwise similarity scores between the sentences based on the degree of the overlap between the corresponding token vectors. Using the pairwise similarity scores as edge weights and the sentences as nodes, the computer may generate a graph of the uttered text in the media file. The computer may then iteratively calculate a global importance score for each sentence using a text rank algorithm. In addition to the global importance score, the computer, for each sentence, may select neighboring sentences and calculate a local importance score from the pairwise similarity scores of sentence with each of the selected neighboring sentences. The computer may then calculate the overall importance score of each sentence by taking a weighted average of the respective global and local importance scores. Based on the overall importance score, the computer may rank the uttered sentences and append the rankings as metadata to the media file. The metadata may contain the rank of each sentence along with the timestamp (e.g. beginning time and end time) of the sentence.

A media player, upon receiving an instruction to advance content at a higher than normal speed, may (i) access the metadata, (ii) retrieve the rankings of the sentences, and (iii) play the highest ranked sentence(s) at normal playback speed in the portion being advanced at a higher than normal speed such that a user may hear normal speed audio of the content being advanced at a higher than normal playback speed. In another embodiment, a computer-implemented method comprises receiving, by a media player, an instruction to advance a media file content at a higher than normal speed; accessing, by the media player, at least a portion of metadata associated with the media file to retrieve a location of a group of the most important words in a portion of the media file content being advanced at the higher than normal speed; and playing, by the media file, audio content of the group of the most important words at a normal speed while advancing the media file at a higher than normal speed.

In one embodiment, a system comprises a non-transitory storage medium storing a media file with associated metadata and media player program instructions; a processor in electrical communication with the non-transitory storage medium, and configured to execute the media player program instructions to: receive an instruction to advance the media file content a higher than normal speed; access at least a portion of the associated metadata to retrieve a location of a group of words determined to be the most important in a portion of the media file content being advanced at the higher than normal speed; and play audio content of the group of the most important words at a normal speed while advancing the media file at a higher than normal speed.

In another embodiment, a computer implemented method comprises: generating, by a computer from a media file, an array from a plurality of uttered words, the array including a plurality of elements containing a text string; generating, by the computer, a token vector of words for each text string in the array; stemming, by the computer, the words in the token vector of words to form a token vector of root words; calculating, by the computer, a score for an occurrence of the root words in each of the token vectors of root words; ranking, by the computer, the plurality of uttered words based upon the scores of the corresponding token vectors of root words; and associating, by the computer, metadata indicating the ranking of the plurality of uttered words with the media file such that a media player plays audio of words having a highest ranking for a portion of the media file over which the media player is playing at a higher speed than a normal speed.

In another embodiment, a system comprises: a non-transitory storage medium configured to store a media file; a processor coupled to the non-transitory storage medium and configured to: generate, from the media file, an array from a plurality of uttered words, the array including a plurality of elements containing a text string; generate a token vector of words for each text string in the array; stem the words in the token vector of words to form a token vector of root words; calculate a score for an occurrence of the root words in each of the token vectors of root words; rank the plurality of uttered words based upon the scores of the corresponding token vectors of root words; and append metadata indicating the ranking of the plurality of uttered words to the media file such that a media player plays audio of words having a highest ranking for a portion of the media file over which the media player is playing at a higher speed than a normal speed.

In yet another embodiment, a computer implemented method of generating a media file and associated metadata for a media player comprises: in response to a computer receiving an instruction to advance a portion of a media file content at higher than normal speed by a numerical speed up factor: identifying, by the computer, based on a timestamp of the instruction, a corresponding timestamp in metadata appended to or otherwise associated with the media file; starting from the corresponding timestamp in the metadata, selecting, by the computer, a plurality of ranking entries such that the number of the plurality of ranking entries matches the numerical speed up factor; determining, by the computer, a ranking entry with a highest rank among the plurality of ranking entries; identifying, by the computer, a start timestamp and an end timestamp for the ranking entry with the highest rank; and playing, by the computer, audio from the media file from the start timestamp and the end timestamp at normal speed while advancing the media file content at higher than normal speed by the numerical speed up factor.

BRIEF DESCRIPTION OF THE DRAWINGS

The accompanying drawings constitute a part of this specification and illustrate embodiments of the subject matter disclosed herein.

FIG. 6C shows a pairwise similarity matrix for the sentences for the sentences shown in FIG. 6A and generated based on the corresponding token vectors shown in FIG. 6B, according to an illustrative embodiment;

FIG. 6D shows a table with iteratively calculated global importance scores for the sentences shown in FIG. 6A and based on the pairwise similarity matrix as shown in FIG. 6C, according to an illustrative embodiment;

FIG. 6E shows a table with iteratively calculated local importance scores for the sentences shown in FIG. 6A and based on a portion of pairwise similarity matrix 6C, according to an illustrative embodiment;

FIG. 6F shows a table with overall importance scores for the sentences shown in FIG. 6A and based on the global importance scores as shown in FIG. 6D and local importance scores as shown in FIG. 6E, according to an illustrative embodiment;

FIG. 7A shows a list of sentences uttered in a video in association with rankings and timestamps, according to an illustrative embodiment;

DETAILED DESCRIPTION

Figure 1:
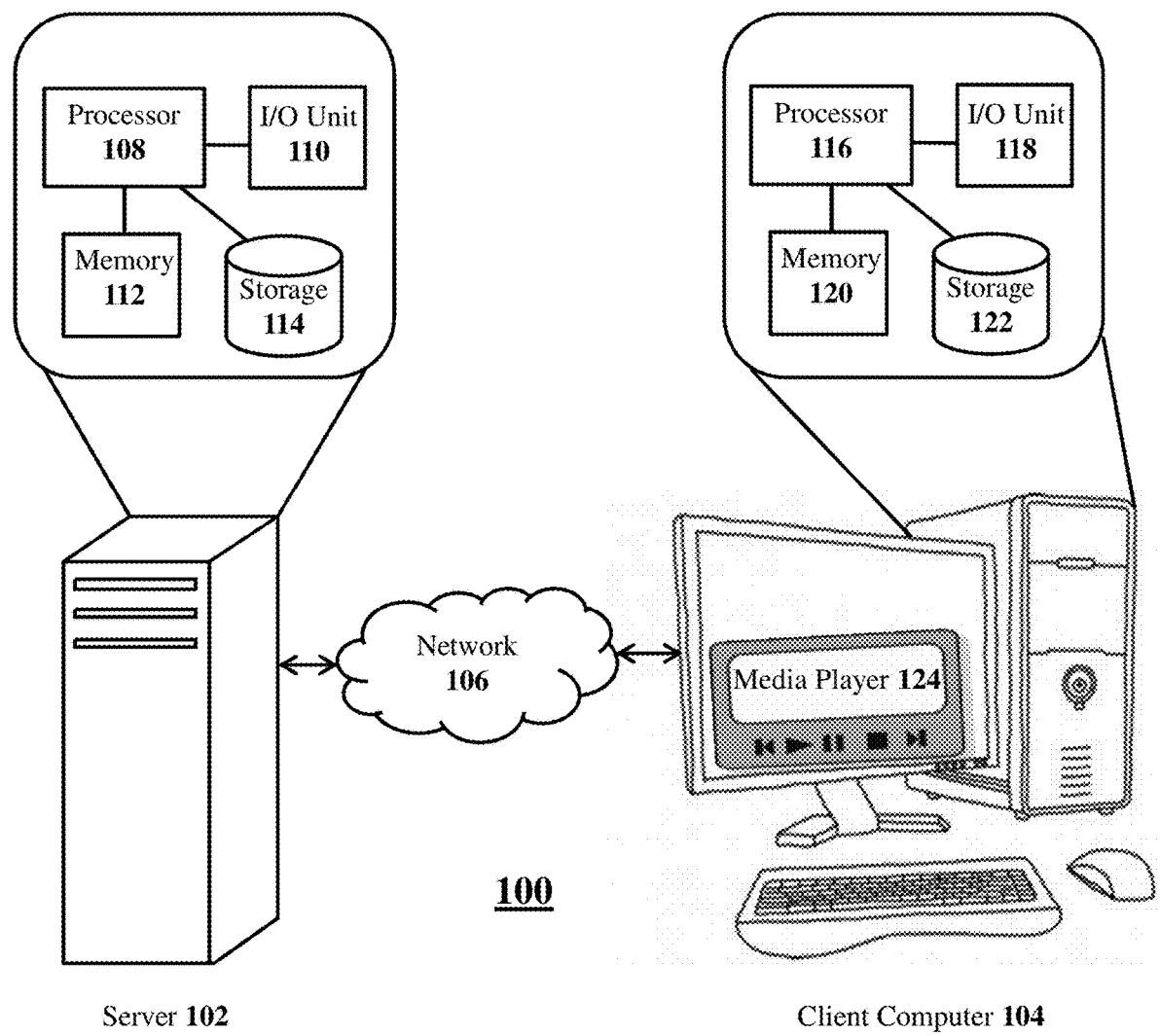
FIG. 1 shows a network environment for appending metadata to a media file for playing audio (e.g., sentence(s)) at normal playback speed while advancing the media file content at higher than normal speed, according to an illustrative embodiment.

When advancing a video at a higher than normal speed, users with normal vision may see the advancing video frames to track the location of the video. Based on the visual cue of the advancing video frames, such users may resume normal playback when a media player reaches a desired location in the video. However, visually impaired users watching a video will not have a visual cue of advancing video frames in knowing what is occurring in the video. Advancing audio at a higher than normal speed also poses similar problems for users, regardless of any visual impairment. If the media player does not play any audio when the audio is advanced at higher than normal speed, a user will not know the audio content being advanced at higher than normal speed. If the media player plays the audio at the higher than normal speed, the audio may be garbled and unintelligible. What is therefore desired is a media player that may play audio samples from a media file (e.g., video file or audio file) at a normal speed while advancing the file at a higher than normal speed.

Embodiments disclosed herein describe a media player and a media file, where the media player can utilize or be controlled by metadata in or associated with the media file to determine and play audio of the most important words at normal speed while advancing the media file content at a higher than normal speed. For example, the metadata may control the media player to selectively play a group of important words specified in or controlled by the media file at a normal speed while the associated content is being fast forwarded at a higher than normal speed, and then selectively play a next group of important words at the normal speed. In another example, the media player may perform two parallel operations: (i) advance the media file content at a higher than normal speed and (ii) play the most important words at a normal speed in parallel with the media content advancement (or rewind).

To generate the metadata for a media file, a computer may analyze uttered text in the media file content to determine the most important words (e.g., names, titles, most uttered terms) or sentences (e.g., sentences with names, titles, most uttered terms) globally and/or locally within content. More particularly, the computer may employ a speech-to-text process to extract the uttered words from the media file. The computer may group the uttered words into sentences or any other grouping of words. Although the computer may group the words into various groups such as phrases, concepts, and/or ideas, this description details, for brevity, sentences as the grouping of words. It should therefore be understood that embodiments using sentences as grouping of words should apply to other form of grouping of words as well.

The computer may then generate an array of uttered sentences. The computer may, for each uttered sentence, remove the stop words and reduce the remaining words to their root for to form a token vector of root words. Comparing the degree of overlap between the each pair of token vectors of root words, the computer may generate a pairwise similarity matrix. The pairwise similarity matrix may include a pairwise similarity score for each pair of token vector of root wordsand the corresponding pair of uttered sentencescalculated by the computer based on the number of overlapping tokens and the length of each token vector of root words in the pair. Using the pairwise similarity scores, the computer may generate a graph interconnecting the uttered sentences in the media file. The computer may represent the sentences as nodes and the respective pairwise similarity scores as edges.

Traversing the graph of sentences as nodes and the pairwise similarity scores as edges, the computer may iteratively calculate a global importance score for each sentence. The computer may first initialize the global importance score as random values and iteratively update the global importance score based upon progressively evaluating the pairwise similarity scores between the sentences. For example, in a first iteration, the computer may determine a global importance score for a first sentence S1 based on its pairwise similarity score with a second sentence S2. In a second iteration, the computer may consider the pairwise similarity scores between a third sentence S3 and each of the first and second sentences S1, S2. If the pairwise similarity score between S2 and S3 is higher compared to S1 and S3, the computer may increase the global importance score of S2 and decrease the global importance score of S1. The computer may iteratively perform the aforementioned calculations until the global importance scores for the sentences converge when the computer has evaluated the pairwise similarity scores for all pairs of the sentences in the graph.

The computer may also calculate a local importance score for each sentence to capture if a speaker in the media file, or portion thereof, has talked about a particular topic for a short duration. The computer may select a set of neighboring sentences (or neighboring token vectors of root words) for a sentence whose local importance score has to be calculated. For instance, the computer may select 16 sentences, including the reference sentence: computer may select 7 sentences before and 8 sentences after the reference sentence. The computer may iteratively generate a local importance score using pairwise similarity scores between the selected sentences through the processes described above.

Using the global and local importance scores, the computer may calculate the overall importance score for each sentence. In some instances, the computer may calculate the overall importance score as a weighted average of the global and local importance scores. If the media file is generally directed to single topic, the computer may weigh the global importance score higher than the local importance score. On the other hand, if the media file is directed to a multitude of topics with frequent topic changes, the computer may weigh the local importance score higher than the global importance score. In some instances, the computer may weigh the global and local importance scores equally, e.g., the coefficients for the weighted average calculation may be 0.5 and 0.5.

From the overall importance scores, the computer may rank the uttered sentences in the media file. If the computer implements an ascending ranking number, the computer may provide a ranking number of 1 to the sentence with the highest overall importance score. If, however, the computer implements a descending ranking number, the computer may provide a ranking number of 1 to the sentence with the lowest overall importance score. The computer may append the rankings of the sentences as metadata in association with timestamps to the media file. For instance, the appended metadata may include a ranking number for a sentence spoken between $435^{th}$ and $450^{th}$ second in the media file.

A media player may utilize the metadata in the media file to play audio associated with or referenced by the metadata at a normal playback speed (also referred to as normal speed) while advancing a portion of the media file content at a higher than normal speed. In other words, the metadata may control the media player to selectively play a group of important words specified in or controlled by the media file a normal speed while the associated content (e.g., video) is being forwarded at a higher than normal speed (also referred to as fast forwarded). The playing of the audio of the most important words, will allow a user, visually impaired or otherwise, to have a normal speed audio preview of the media file content that is being advanced or forwarded at a higher than normal speed. For example, if a user instructs the media player to fast forward the media file content by a factor of 16 at time T, the computer may access the metadata at or near (e.g., within a certain number, such as 16, of sentences from time T) to retrieve the rankings and timestamps of 16 sentences after time T. The media player may identify the timestamps, such as begin and end times, of the highest ranked sentence (i.e., sentence with the highest or lowest ranking number, depending upon the ranking number scheme) of the 16 sentences, and play the audio at the normal playback speed between the begin and end times. The played audio thereby may be considered a time-lapsed audio summary of the portion of the media file that is being advanced at higher than normal speed.

It should be understood that the media file may an audio file or a video file. Furthermore, advancing the media file content may be performed in either direction, i.e., fast forward or rewind. The embodiments disclosed herein also equally apply to close-captioned or any other type of media file, where the media player may display the highest ranked sentence for certain duration while the other media file content itself is being advanced at higher than normal speed.

FIG. 1 shows an illustrative network environment 100 for appending metadata to a media file for a playing of audio at normal speed while advancing the media file at higher than normal speed, according to an illustrative embodiment. The illustrative system 100 may comprise a server 102 and a client computer 104 interconnected by a network 106. It should be understood that listed components of the network environment 100 are merely illustrative, and additional, substitute, or lesser number of components should be considered within the scope of this disclosure.

The server 102 may include a processor 108, an input output (I/O) unit 110, a memory 112, and storage 114. The processor 108 may include any type of processor that may implement one or more instruction sets (e.g., digital signal processing) to enable the processing functionality of the server 102. For example, the processor 108 may command and control the following processes: (i) receiving a media file to be processed, (ii) generating a subtitle file containing uttered sentences in the media file, (iii) generating token vectors of root words from the uttered sentences, (iv) calculating pairwise similarity scores of the sentences based on the token vectors, (v) iteratively calculating a global importance score for each sentence based on the similarity scores, (vi) iteratively calculating a local importance each sentence based on the similarity scores of neighboring sentences, (vii) calculating overall importance scores of each sentence as a weighted average of corresponding global importance score and local importance score, (viii) ranking the sentences based on the respective overall importance scores, and (ix) appending metadata containing the rankings of the sentences in association with timestamps of the sentences to the media file. The I/O unit 110 may communicate with the client computer 104 and/or computers through the network 106. The memory 112 may be any type of non-transitory memory from which the processor 108 may read input instructions and input data, and to which write output instructions and output data. For instance, the memory 112 may be a random access memory (RAM), cache memory, and/or virtual memory implemented by the operating system of the server 102 utilizing a portion of the storage 114. The storage 114 may any type of electronic storage, such as a hard drive, to store the software modules used by the processor 108 that appends or otherwise associates the sentence ranking and timestamp metadata to a received media file, as further described herein (see, for example, FIG. 7B).

The network 106 may be any type of network implementing one or more communication protocols between the server 102 and the client computer 104. Examples of the network 106 include, but are not limited to, Local Area Network (LAN), Desk Area Network (DAN), Wireless Local Area. Network (WLAN), Metropolitan Area Network (MAN), Wide Area Network (WAN), and the Internet. The communication over the network 106 may be performed in accordance with the one or more communication protocols, such as Transmission Control Protocol and Internet Protocol (TCP/IP), User Datagram Protocol (UDP), and IEEE communication protocols.

The client computer 104 may be any kind of computer that includes a processor 116, an I/O unit 118, a memory 120, and a storage 122. The processor 116 may include any kind of processor configured to execute a media player 124 for playing media files in accordance with the principles described herein. For example, the processor may command and control (i) receiving an instruction to advance media file content at a higher than normal speed, (ii) retrieving metadata containing sentence rankings and the associated timestamps, and (iii) playing audio of highest ranked sentences at a normal playback speed while the content is being advanced at the higher than normal speed. The I/O unit 118 may communicate with the server 102 and/or computers through the network 106. The I/O unit 118 may further receive instructions from a user to advance the media content at a higher than normal speed. The storage 122 may store software modules of the media player 124 and media file with associated or appended metadata (not shown) to be played by the media player 124.

Figure 2:
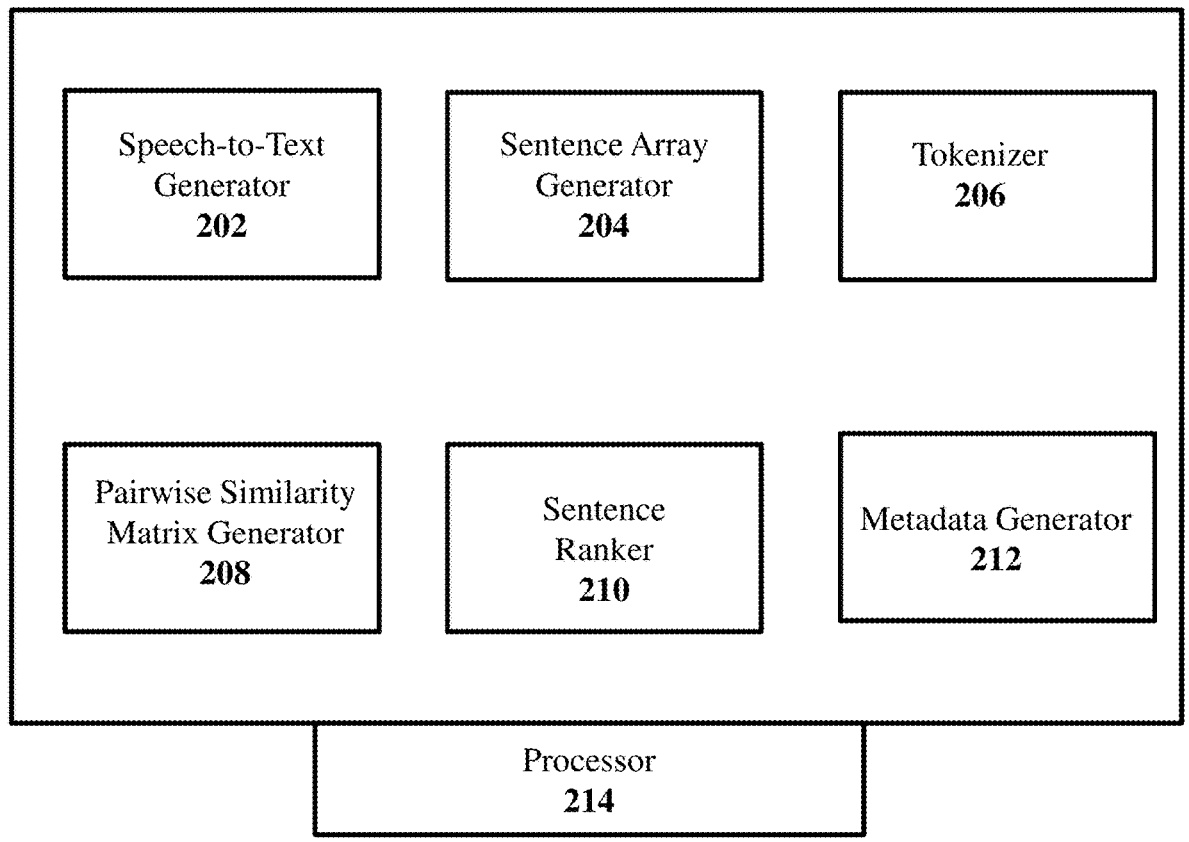
FIG. 2 shows a block diagram of software modules for appending metadata to a media file for playing audio at normal playback speed while advancing the media file content at higher than normal speed, according to an illustrative embodiment.

FIG. 2 is a block diagram showing illustrative software modules 200 implementing one or more processes described throughout this disclosure. A processor 214 may execute the software modules 200. The software modules 200 may include a speech-to-text generator module 202, a sentence array generator module 204, a tokenizer module 206, a pairwise similarity matrix generator module 208, a sentence ranker module 210, and a metadata generator module 212.

The speech-to-text generator module 202 may generate a subtitle file from a media file, which may be an audio file or a video file. The subtitle file may be a .srt file type containing the uttered text in the media file. The sentence array generator module 204 may extract sentences out of the subtitle file and form a sentence array. An element in the sentence array may include a sentence in association with a respective timestamp. A timestamp for a sentence may be the begin time and the end time of the utterance of the sentence in the media file. The tokenizer module 206 may generate a token vector of root words for each sentence, and store the token vectors to a token vector array. To generate a token vector of root words for a sentence, the tokenizer module 206 may remove stop words, such as auxiliary verbs, conjunctions, and/or prepositions, from the sentence, as understood in the art. The tokenizer module 206 may then stem the remaining words to reduce the remaining words to a respective root form. For example, the tokenizer module 206 may convert the word "went" to root word "go."

The pairwise similarity matrix generator module 208 may generate a pairwise similarity matrix for sentences (full sentences or abbreviated sentences) uttered in the media file based on the token vectors of root words corresponding to the sentences. To generate the pairwise similarity matrix, pairwise similarity matrix generator module 208 may count the number of overlapping tokens (i.e., root words without stop words) between the respective token vectors. The pairwise similarity matrix generator module 208 may then divide the counted number by the sum of logarithms of the lengths of the token vectors to generate a pairwise similarity score of the corresponding sentences. The pairwise similarity matrix generator module 208 may generate the pairwise similarity matrix containing a pairwise similarity score for each pair of uttered sentences in the media file.

The sentence ranker module 210 may rank the uttered sentences in the media file based on the pairwise similarity matrix. The sentence ranked module 210 may rank the sentences based on the overall importance score of each sentence. The overall importance score, in turn, may be based upon a global importance score and a local importance score. To calculate the global importance score, the sentence ranker module 210 may generate a graph, where the sentences may be nodes interconnected with edge weights of the pairwise similarity scores. The sentence ranker module 210 may execute a text ranker algorithm to iteratively calculate the global score of each sentence based on the pairwise similarities between the sentences (or the corresponding token vector of root words). The sentence ranked module 210 may further calculate a local importance score for each sentence. To calculate a local importance score for a sentence, the sentence ranker module 210 may select a set of neighboring sentences. For example, the sentence ranker module 210 may select 16 neighboring sentences: 7 sentences before the sentence and 8 sentences after the sentence. The sentence ranker module 210 may iteratively calculate local importance of the sentence using a standard text rank algorithm.

The metadata generator module 212 may generate metadata based on the one or more rank of the sentence. The metadata may include timestamps for each sentence and the ranking(s) of the sentence. The timestamps may include start and end times for each sentence. The timestamps may be associated with the ranking(s) of the corresponding sentence. For example, a table containing metadata may store the timestamp and the ranking(s) of the corresponding sentence as row in the table, i.e., a single data record. The metadata may be appended to the media file such that a media player may extract the metadata to play audio at normal playback speed while advancing associated media file content at higher than normal speed.

It should be understood that the respective functionality of the aforementioned software modules is merely illustrative and similar functionality may be achieved by different set of software modules. Furthermore, the software modules described herein may achieve alternative and additional functionality, which should be considered to be within the scope of this disclosure.

Figure 3:
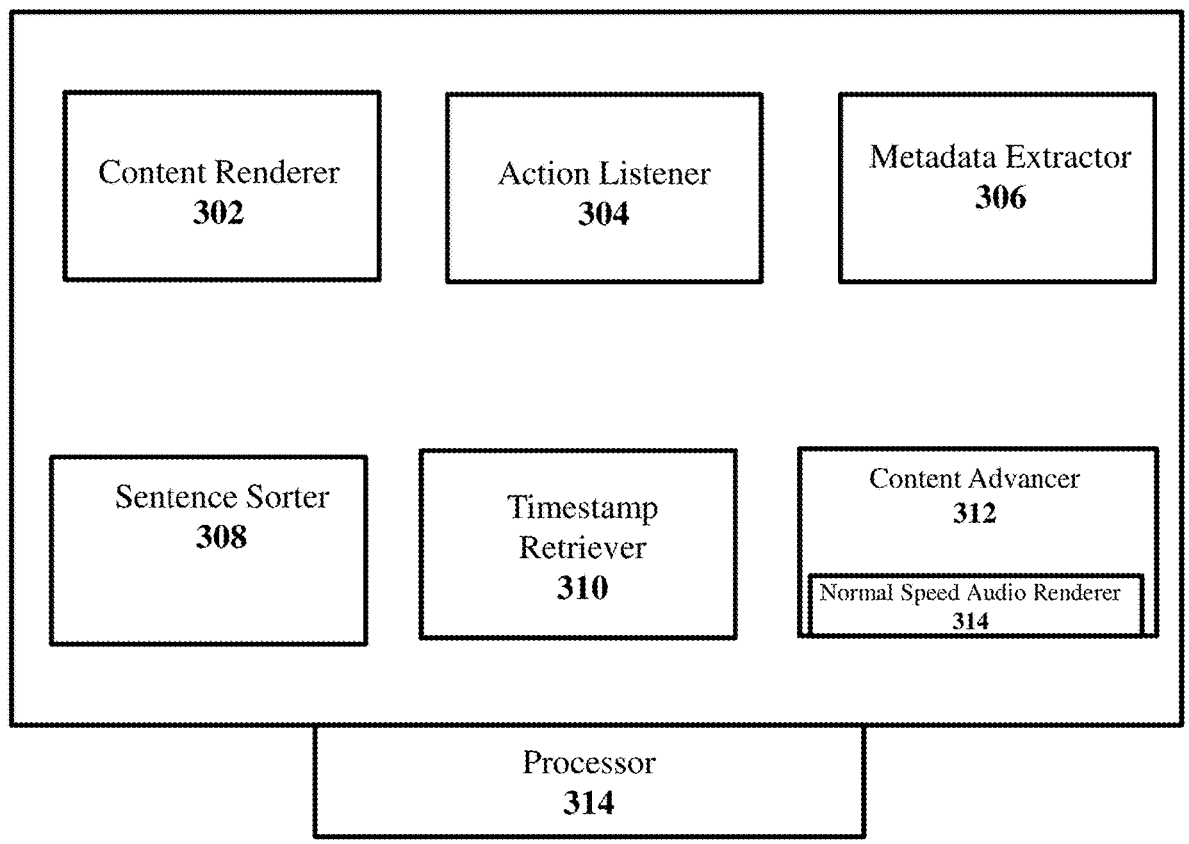
FIG. 3 shows a block diagram of software modules for extracting metadata from a media file for playing audio at normal playback speed while advancing the media file content at higher than normal speed, according to an illustrative embodiment.

FIG. 3 shows a block diagram showing illustrative software modules 300 implementing one or more processes to operate as a content media player described throughout this disclosure. A processor 314 may execute the software modules 300. The software modules 300 may include a content renderer module 302, an action listener 304, a metadata extractor module 306, a sentence sorter module 308, timestamps retriever module 310, and a content advancer module 312. The content advancer module 312 may in turn include a normal speed audio renderer module 314. The software modules 300 may be a part of a media player executed by a client computer, to play a media file with appended metadata (or metadata otherwise associated with the media file).

The content renderer module 302 of the media player may render media file content. For a media file containing video, the content renderer module 302 may display successive video frames synchronized with audio frames. For a media file containing audio, the content render module 302 may play successive audio frames. The action listener module 304 of the media player may monitor any action from a user when the content renderer module 302 is displaying video frames and/or playing audio frames. For instance, the action listener module 304 may monitor any user interaction with on-screen graphic objects, such as selectable icons for fast-forward or rewind, any keyboard actions, such as a user pressing keys for various commands for the media player, and/or any audible commands received by a microphone. The metadata extractor module 306 of the media player may extract appended metadata, containing the rankings and the associated timestamps, from the media file.

The sentence sorter module 308 may sort sentences within the media file content being advanced at higher than normal speed based on the rankings of the sentences as indicated in the metadata. Based on the sorting, the sentence sorter module 308 may identify the highest ranked sentence in the portion of the media file content being advanced at a higher than normal speed. The timestamp retriever module 310 may retrieve the timestamps (begin and end times) of the highest ranked sentence. The content advancer module 312 may advance content at a higher than normal speed based on one or more instructions received by the action listener module 304. For instance, if the action listener module 304 receives a fast forward instruction, the content advancer module 312 may advance the content of the media file at a higher than normal speed. The normal speed audio render module 314 may play the audio in between the timestamps, i.e., begin and end times, of the highest ranked sentence while the content advancer module is advancing the media file content at a higher than normal playback speed.

It should be understood that the respective functionality of the aforementioned software modules is merely illustrative and similar functionality may be achieved by different set of software modules. Furthermore, the software modules described herein may achieve alternative and additional functionality, which should be considered to be within the scope of this disclosure.

Figure 4:
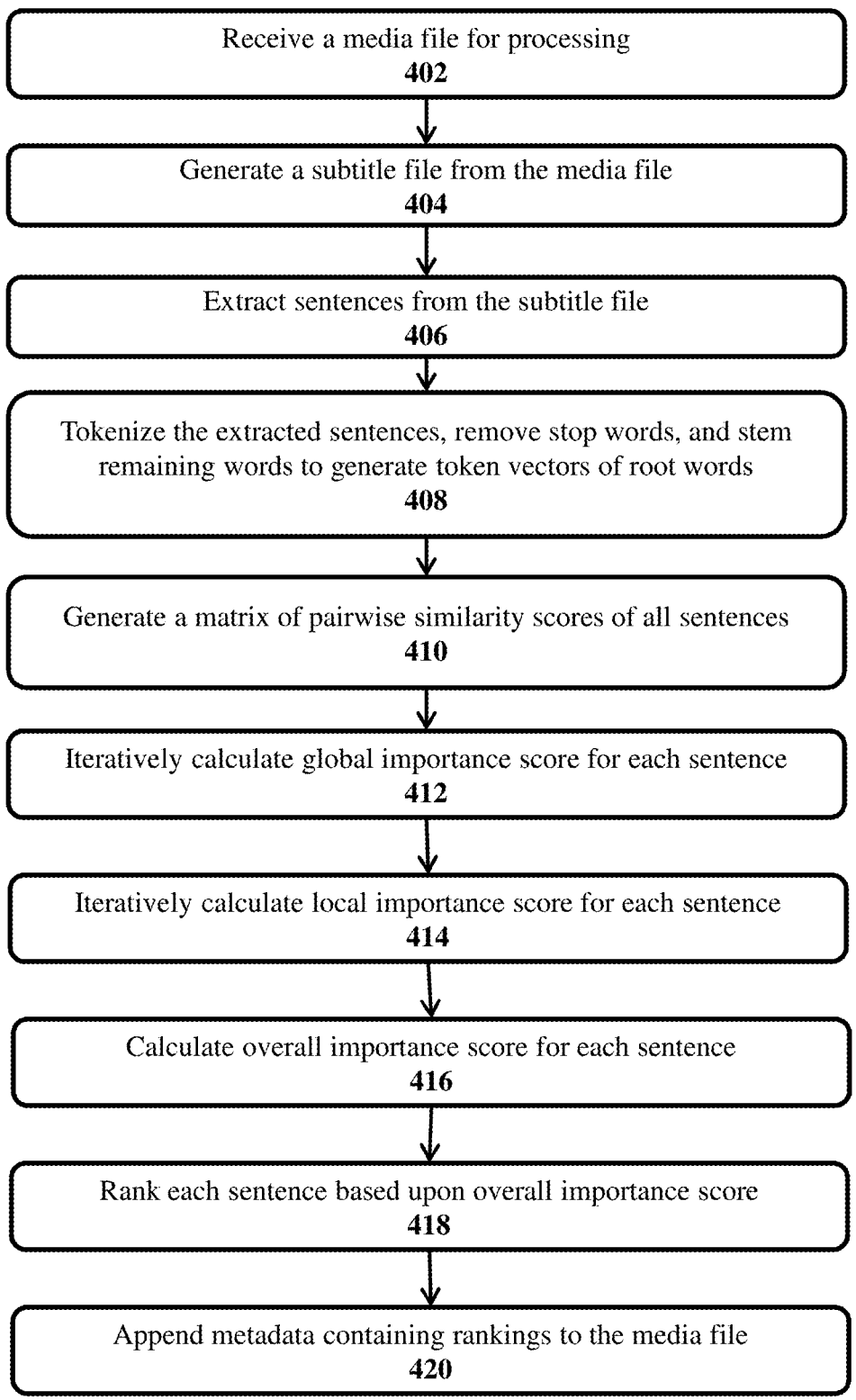
FIG. 4 shows a flow diagram of a method for appending metadata to a media file for playing audio at normal playback speed while advancing the media file content at higher than normal speed, according to an illustrative embodiment.

FIG. 4 shows a flow diagram 400 of an illustrative method for appending metadata to a media file for playing audio portions at real-time or normal speed when media file content is being advanced at higher than normal speed, according to an illustrative embodiment. Although multiple computers, multiple software modules, and multiple databases may implement one or more steps of the method, this description details, for brevity, the steps being implemented by a computer. Furthermore, the steps shown in the flow diagram 400 are merely illustrative, and additional steps or alternative steps should be considered within the scope of this disclosure. Furthermore, one or more of the steps may be skipped during the implementation of the method.

The method may begin at step 402, where the computer may receive a media file for processing. The media file may be an audio file or a video file in any format known in the art. Non-limiting examples of format include an uncompressed format, lossless compression format, and lossy compression format. The computer may receive the media file with a request from a user to process the media file, and to append or associate metadata with the media file for a media player to use with the media file. In an embodiment, based on the metadata, a media player may play audio with highest ranked sentences at portions of the media file content instructed to advance at a higher than the normal speed.

In step 404, the computer may generate a subtitle file from the media file. The computer may generate the subtitle file from any video-to-text or audio-to-text conversion techniques known in the art. In some embodiments, the subtitle file may be in .srt format. The subtitle file may include a plurality of sentences uttered in the media file corresponding time-stamps. For example, the subtitle file may contain a listing of sentences in association with a start time and an end time for each of the sentences derived from audio of the media file.

In step 406, the computer may extract sentences from the subtitle file, and form an array of the extracted sentences. In an embodiment, the computer may execute the illustrative code shown in TABLE I to extract the sentences and form an array.

TABLE I

Illustrative code to extract sentences from a subtitle file and form and array of the extracted sentences.

```
var srtFile = fs.readFileSync('../srtFiles/JPyuH4qXLZO.srt',
'sutf8');
var data = parser.fromSrt(srtFile, true);
data = data.slice(0,100);
var formSentences = function(data){
  var longSenArr = new Array( );
  var longSen = "";
  var startTime = data[0].startTime;
  for (var i = 0; i< data.length; i++){
    data[i].text = data[i].text.replace("\n"," ");
    var splitPoint = data[i].text.indexOf(".");
    longSen = longSen + " " + data[i].text;
    if(splitPoint != −1){
      var obj = { };
      obj["startTime"] = startTime;
      obj["endTime"] = data[i].endTime;
      obj["text"] = longSen;
      if(i < data.length −1){
        startTime = data[i+1].startTime;
      }
      longSenArr.push(obj);
      longSen = ""
    }
  }
  return longSenArr;
}
```

In step 408, the computer may tokenize the extracted sentences, remove stop words, and stem the remaining words to generate token vectors of root words for each extracted sentence. The computer may first remove the stop words and other less significant words from the extracted sentences. Non-limiting examples of stop words and less significant words may be auxiliary verbs, conjunctions, and prepositions. The computer may then stem the remaining words to reduce them to their root forms. For example, the computer may reduce the word "went" to its root form "go." After the removal of the stop words and stemming, the computer may generate a token vector of root words for each sentence. The computer may execute the illustrative code shown in TABLE II for tokenization and stemming.

TABLE II

Illustrative code for tokenization and stemming.

```
var getSentenceTokenArray = function(sentences){
  var sentenceTokenArr = new Array( );
  var tokenizer = new natural.WordTokenizer( );
  natural.PorterStemmer.attach( );
  for (var i = 0; i < sentences.length; i++) {
    sentenceTokenArr.push(sentences[i].tokenizeAndStem( ));
  }
  return sentenceTokenArr;
}
```

In step 410, the computer may generate a matrix of the pairwise similarity scores for pairs of sentences uttered in the media file. The computer may calculate a pairwise similarity score of a pair of sentences (a first sentence $S_i$ and a second sentence $S_j$) based on the degree of overlap between the corresponding vectors of root words (i.e., between a first vector of root words and a second vector of root words). The computer may first identify and count the number of overlapping root words in the first and second vectors of root words. The computer may then calculate the logarithms of the length of the each of the first and second vectors, and calculate the sum of the logarithms. The computer may then divide the number of the overlapping root words by the sum of logarithms to calculate a pairwise similarity score between the first sentence $S_i$ and the second sentence $S_j$. TABLE III shows illustrative code for calculating pairwise similarity scores between sentences.

TABLE III

Illustrative code for calculating pairwise similarity score of a pair of sentences.

```
var similarityScoring = function(SiTokens, SjTokens) {
  var overlap = { }
  for (var i = 0; i < SiTokens.length; i++) {
    var word = SiTokens[i];
    if (!overlap[word]) {
      overlap[word] = { }
    }
    overlap[word]['i'] = 1;
  }
  for (var i = 0; i < SjTokens.length; i++) {
    var word = SjTokens[i];
    if (!overlap[word]) {
      overlap[word] = { }
    }
    overlap[word]['j'] = 1;
  }
  var logLengths = Math.log(SiTokens.length) +
    Math.log(SjTokens.length);
  var wordOverlapCount = 0;
  for (index in overlap) {
    var word = overlap[index]
    if (Object.keys(word).length === 2) {
      wordOverlapCount++;
    }
  }
  return wordOverlapCount / logLengths;
}
```

In step 412, the computer may iteratively calculate a global importance score for each sentence. The computer may execute a text ranking algorithm to calculate the global importance score for each sentence using the pairwise similarity scores generated in step 410. In an embodiment, the computer may first generate a graph with sentences as nodes and the pairwise similarity scores as edge weights. The computer may iteratively traverse the graph while updating the global importance score for each sentence every iteration. For example, in a first iteration, the computer may determine a global importance score for a first sentence $S_1$ based on its pairwise similarity score with a second sentence $S_2$. In a second iteration, the computer may consider the pairwise similarity scores between a third sentence $S_3$ and each of the first and second sentences $S_1$, $S_2$. If the pairwise similarity score between $S_2$ and $S_3$ is higher compared to $S_1$ and $S_3$, the computer may increase the global importance score of $S_2$ and decrease the global importance score of $S_1$. The computer may iteratively perform the aforementioned calculations until the global importance scores for the sentences converge when the computer has evaluated the pairwise similarity scores for the all pairs of the sentences in the graph. TABLE IV shows illustrative code executed by the computer for calculating the global importance score for each sentence.

TABLE IV

Illustrative code for calculating global importance score of each sentence

```
var tokenizedSentences = getSentenceTokenArray(sentences);
var settings = {
  tokens: sentences,
  split: tokenizedSentences
}
var globalSentenceScores = new tr.TextRank("", settings);
```

In step 414, the computer may iteratively calculate local importance score for each sentence. To calculate the local importance score for a sentence $S_1$, the computer may select a set of neighboring sentences. The set of neighboring sentences, in some instances may include 16 sentences, including the sentence $S_1$. Out of the 16 sentences, 7 sentences may precede $S_1$ and 8 sentences may follow $S_1$. The computer may the use the pairwise similarity scores between each pair of sentences in the 16 sentences to calculate the local importance score for sentence $S_1$ by using the same iterative algorithm as in step 412. TABLE V shows illustrative code for calculating a local importance score for each sentence.

TABLE V

Illustrative code for calculating local importance score for a sentence.

```
var getLocalScores = function(sentences){
    var localScoresArr = new Array( );
    for (var i = 0; i < sentences.length; i++) {
        var tempSenSet = new Array( );
        var currentSenIndex, itNum=0;
        for(var j = i - 7; j <= i + 8; j++){
            if(j >= 0 && j < sentences.length){
                tempSenSet.push(sentences[j])
                If(j == i){
                    currentSenIndex = itNum;
                }
            }
            itNum++;
        }
        var tempTokenSet = getSentenceTokenArray(tempSenSet);
        var localScores = textRankScoring(tempSenSet, tempTokenSet);
        var currentSenLocalScore =
localScores.rankedSentences[currentSenIndex].score;
        local ScoresArr.push(currentSenLocalScore);
    }
    return localScoresArr;
}
```

In step 416, the computer may calculate the overall importance score of each sentence. The computer may calculate the overall importance score as a weighted average of the corresponding global and local importance scores. For the media file content generally directed to a single topic, the computer may include a higher weight for the global importance score and a lower weight for the local importance score. For a media file content directed to multiple topics, wherein the local contextual changes may be significant, the computer may include a lower weight for the global importance score and higher weight for the local importance score. In some implementations, the computer may include an equal weight (e.g., 0.5, 0.5) for each of the global and local importance scores.

In step 418, the computer may rank each sentence based on overall importance score. In other words, the computer may assign a ranking number to each sentence based upon the overall importance scores. In some instance, the computer may assign the lowest rank number to the sentence with the highest overall importance score, thereby assigning the ranking numbers in ascending order. In other instances, the computer may assign the highest ranking number to the sentence with the highest overall importance score, thereby assigning the ranking numbers in descending order. TABLE VI shows illustrative code for ranking each sentence.

TABLE VI

Illustrative code for ranking each sentence

```
var getRanks = function(numData){
    var sortedData = numData.slice( );
    sortedData = sortedData.sort(function(a, b){return b-a});
```

TABLE VI-continued

Illustrative code for ranking each sentence

```
    var ranks = new Array( );
    for (var i = 0; i < numData.length; i++){
        for (var j = 0; j < numData.length; j++){
            if(numData[i] == sortedData[j]){
                ranks.push(j+1);
                break;
            }
        }
    }
    return ranks;
}
```

In step 420, the computer may append metadata containing rankings to the media file. An illustrative metadata may comprise the ranking for each sentence in association with timestamps (e.g., begin and end times) for the sentence. The metadata can be used by a media player to play audio at a normal playback speed while advancing the media file content at a higher than normal speed, as detailed below.

Figure 5:
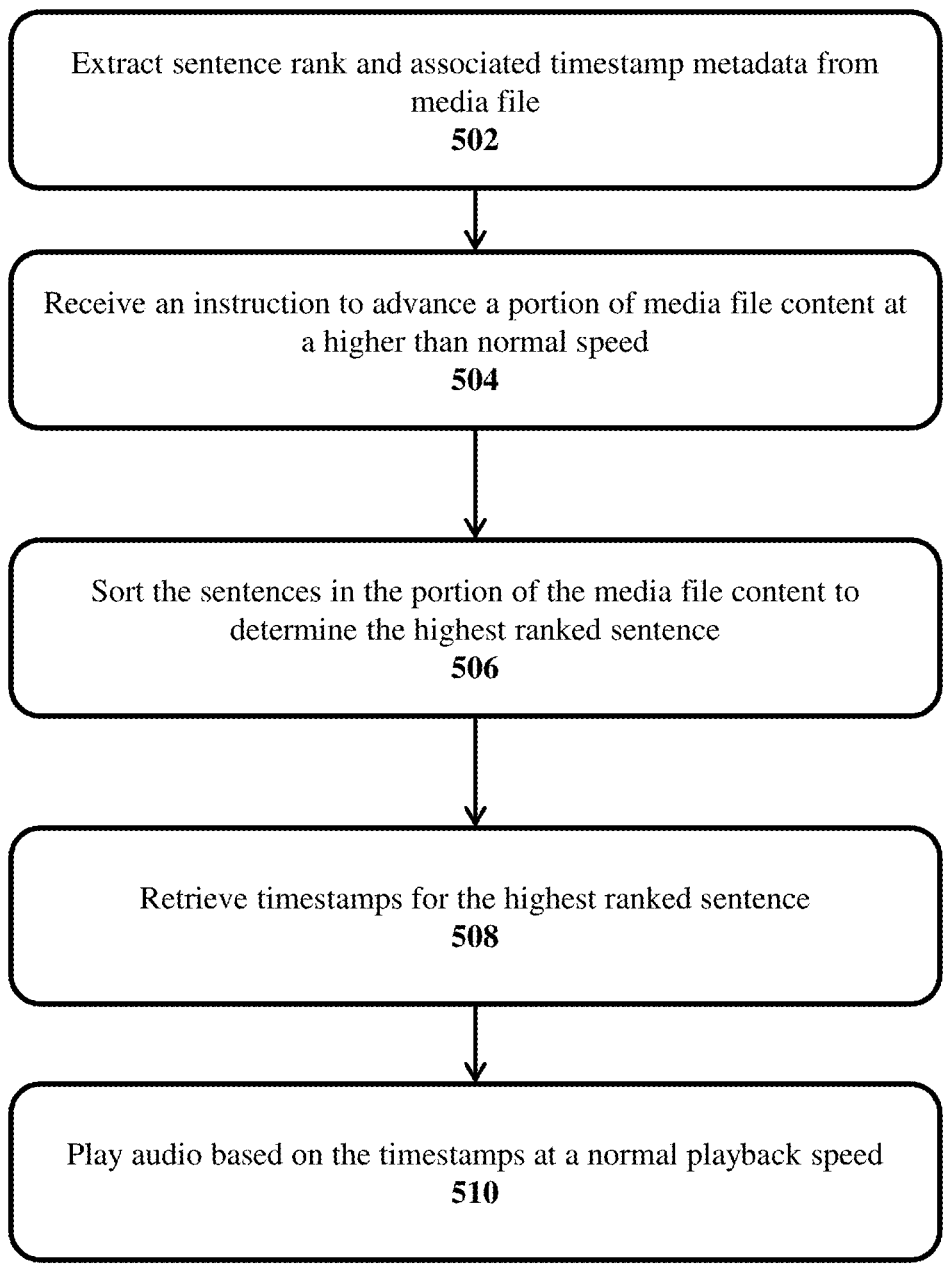
FIG. 5 shows a flow diagram of a method for extracting metadata from a media file for playing audio at normal playback speed while advancing the media file content at higher than normal speed, according to an illustrative embodiment.

FIG. 5 shows a flow diagram 500 of an illustrative method for audio playback at normal speed while advancing a media file content at a higher than normal speed, according to an illustrative embodiment. Although multiple computers and multiple software modules may implement one or more steps of the method, this description details, for brevity, the steps being implemented by a media player.

The method may begin at step 502 where the media player may extract sentence rank and associated timestamp metadata from a media file. The media file content may be audio format or in video format. In some instances, the metadata may be stored in the same container format as the audio/video tracks of the media file. In some instances, a separate media player readable metadata file may be provided with the media file. Regardless of the format, the metadata may contain sentence ranks and the associated timestamps. The sentence ranks may be indicated using a ranking number, either in ascending or descending order. For an ascending order, the highest ranked sentence may have the lowest ranking number and lowest ranked sentence may have the highest ranking number. For a descending order, the highest ranked sentence may have the highest ranking number and the lowest ranked sentence may have the lowest ranking number.

In step 504, the media player may receive an instruction to advance a portion of media file content at a higher than normal speed. In some instances, the instruction may be in the form of a user interacting with a graphical user interface (GUI) of the media player, wherein the user may select a "fast forward" or a "reverse"/"rewind" button. In other instances, the user may press a physical button on a computer keyboard to instruct the media player to advance the media file content at a higher than normal speed. As an alternative, the command may be oral in which the user uses his/her voice to instructs the media player through a voice assistance software and/or hardware modules. In some instances, the user may enter the command on a command line interface (CLI). In some embodiments, the user may enter the command through other accessibility channels provided by the computer running the media player. However, it should be understood that the aforementioned ways that the media player receives the instruction are merely illustrative and other forms of instructions should be included within the scope of this disclosure. Furthermore, the instruction to advance content may be either direction, i.e., the user may command the media player to fast forward the content or reverse the content.

As a part of the instruction, the media player may receive a speed-up factor for advancing the portion of the media file content at higher than normal speed. For example, the user may through an interaction with a fast forward button may instruct the media player to fast forward the portion of the media file content at twice the normal playback speed (2×), four times the normal playback speed (4×), eight times the normal playback speed (8×), sixteen times the normal playback speed (16×), and thirty two times the normal playback speed (32×) (or, Nx in general). To achieve one or more of the aforementioned speed-up factors, the user may click and hold the fast forward button in the GUI or physically press and hold a physical fast-forward button on a keyboard. Furthermore, the aforementioned speed-up factors are merely illustrative and other speed up factors should be considered to be within the scope of this disclosure. The user may provide speed-up factor to advance the portion of the media file content in the reverse direction as well.

Although this illustrative method may apply to advancing content at a higher than normal speed in any direction, the following steps detail, for brevity, processes implemented by a media player in a fast forward operation.

In step 506, the media player may sort the sentences in the portion of the media file content to determine the highest ranked sentence. For example, if the user instructs the media player to fast forward the portion of media file content at a higher than normal speed at time T with a speed factor of 16, the media player may retrieve metadata for next 16 sentences starting from time T. The media player may sort the 16 sentences to determine the highest ranked sentence among the 16 sentences. In the embodiments where the rankings are numbered in ascending order, the highest ranking sentence may have the lowest ranking number within the 16 sentences. If other speeds are selected, then other number of sentences to evaluate ranking may be selected.

In step 508, the media player may retrieve timestamps for the highest ranked sentence in the portion of the media file content. The timestamps for the highest ranked sentence may include a begin time and an end time for the sentence. Each of the begin and end times may be in seconds in reference to the begin time of the media file content. For example, timestamps for the highest ranked sentence may have a begin time at 400 seconds from the beginning of the media file content and an end time at 415 seconds from the beginning of the media file content. Alternatively, a beginning and length of the sentence may be utilized.

In step 510, the media player may play audio based on the timestamps at a normal playback speed. Using the above begin and end times example, the media player may play the audio in between the begin and end times at the normal playback speed while advancing the content at a higher than normal speed. In an embodiment, rather than playing the entire sentence, a portion, such as the beginning or word determined to be important, of the sentence may be played. Therefore, the media player may utilize the metadata in the media file to determine and play audio of the most important words at normal speed while advancing the media file content at a higher than normal speed. In other words, the metadata may control or otherwise be used by the media player to selectively play a group of most important words specified in or controlled by the media file at normal speed while the associated content is being forwarded at a higher than normal speed.

TABLE VII shows illustrative pseudo-code for implementing one or more steps of the method 500.

TABLE VII

Illustrative pseudo code playing audio of a portion of a media file content being advanced at a higher than normal speed.

For i = R; i < Last Row || user resumed normal playback; i = i + N
   Determine the row R_Max amongst i + 1, i + 2, ... 1 + N that has the lowest rank (i.e. highest importance)
   Identify the start R_Max_Start and end time R_Max_End of row R_Max
   The corresponding audio content from R_Max_Start till R_Max_End will be narrated to the user at normal playback TABLE VII: Illustrative pseudo code playing audio of a portion of a media file content being advanced at a higher than normal speed.

TABLE VIII shows illustrative code for implementing one or more steps of the method.

TABLE VIII

Illustrative code playing audio of a portion of a media file content being advanced at a higher than normal speed.

```
function fastForward(x){
    while((audio.currentTime > sentences[currentSenId][ "startTime"]) && (currentSenId < sentences.length − 1]){
        currentSenId++;
    }
    audio.removeEventListener("timeupdate", fastForwHelper);
    audio.removeEventListener("timeupdate", standardSpeed);
    currentSpeed ■ x;
    if(currentSpeed !■ 1)
        audio.addEventListener("timeupdate", fastForwHelper, false);
    else
        audio.addEventListener("timeupdate", standardSpeed, false);
}
function fastForwHelper( ){
    if {Math.cell(audio.currentTime) > sentences[currentSenId][ "endTime"]){
        var currentSenWindow ■ new Array( );
        var tempSen ■ lastSenInWindow + 1
        for (var i ■ 0; i < currentSpeed; i++){
            if(tempSen < sentences.length){
                currentSenWindow.push(sentences[tempSen])
                tempSen++;
            }
        }
        var sortedSen ■ currentSenWindow.slice( );
        var sortedSen ■ sortedSen.sort(function(a, b){
            var rankA ■ ["rank"], rankB ■ b["rank"];
            if(rankA < rankB) return −1;
            if(rankA > rankB) return 1;
            return 0;
        });
        currentSenId ■ sortedSen[0]["id"];
        var htmlElements ■ "";
        for (var i ■ 0; i < currentSenWindow.length; i++){
            if(currentSenWindow[i]["id"] ■ ■ sortedSen[0]["id"])
                htmlElements +■ '<div style■"border:1px solid black;"><font size■"3" color■"red">'+currentSenWindow[i]["text"]+'</font></div>';
            else
                htmlElements +■ '<div style■"border:1px solid black;">' + currentSenWindow[i]["text"]+ '<i/div>';
        }
        document.getElementById("container").innerHTML ■ htmlElements;
        lastSenInWindow ■ tempSen −1;
        audio.currentTime ■ sortedSen[0]["startTime"];
    }
}
```

Figure 6A:
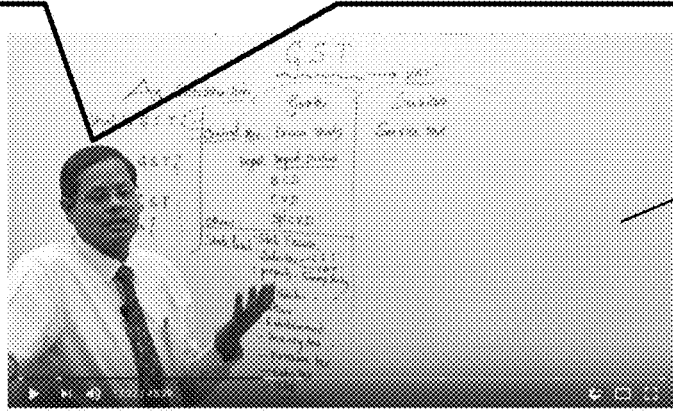
FIG. 6A shows a listing of sentences extracted from a video, according to an illustrative embodiment.

FIG. 6A shows illustrative sentences 602a-602k (collectively referred to as 602) extracted from audio data of a video 604, according to an illustrative embodiment. A computer may extract the illustrative sentences 602 as a subtitle file (.srt) by using audio to text processing processes known in the art. It should be understood that grouping the uttered words in sentences 602 is merely illustrative and other form of grouping of words, such as phrases and concepts, are considered to be within the scope of this disclosure.

Figure 6B:
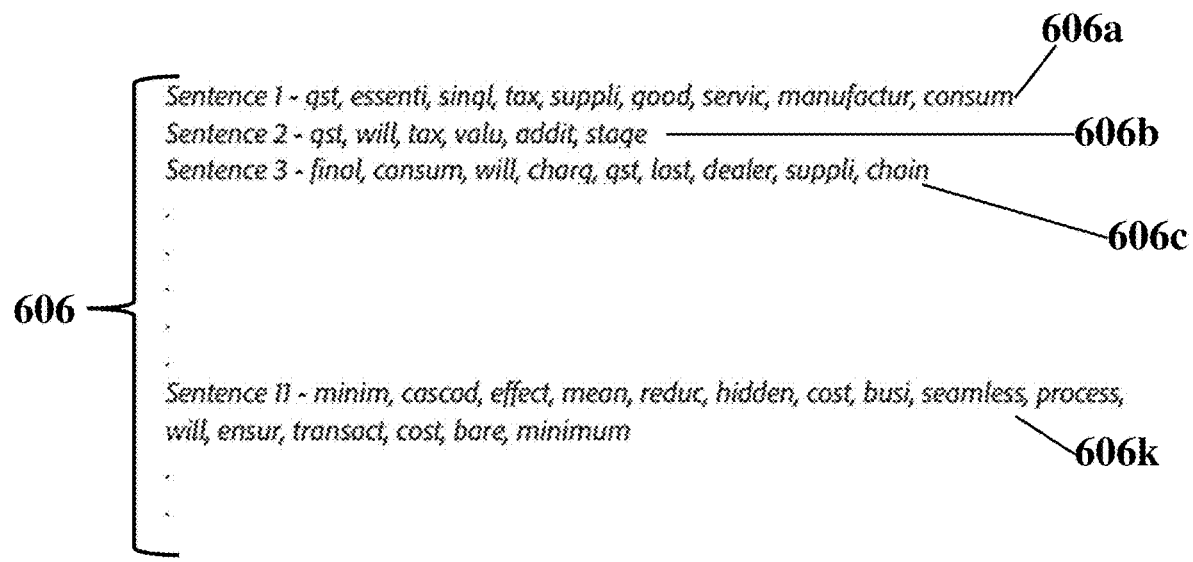
FIG. 6B shows a listing of token vectors of root words generated from the sentences in FIG. 6A, according to an illustrative embodiment.

FIG. 6B shows illustrative token vectors 606a-606k (collectively referred to 606) of root words generated by the computer from the corresponding sentences 602a-602k. To generate the token vectors 606, the computer may perform stemming of the sentences 602 to generate base form of each of the words. The computer may further remove the stop words, such as articles, auxiliary verbs, and/or pronouns. Stemming of the words and the removal of the stop words may reduce each of the sentences 602a-602k to the corresponding token vectors 606a-606k. For example, the sentence 602a includes the following words, "GST is essentially a single tax on the supply of goods and services, all the way from manufacturers to consumers." After the computer removes the stop words, the sentence 602a may be reduced to "GST essentially single tax supply goods services manufactures consumers." Stemming may be performed by the computer to reduce the sentence 602a of FIG. 6A to the token vector 606a containing tokens {gst, essenti, singl, tax, suppli, good, servic, manufactur, consum}.

FIG. 6C shows a pairwise similarity matrix 608 generated by the computer based on a pairwise comparison of token vectors 606. The cells of the pairwise similarity matrix 608 may show a pairwise similarity scores (for example, 610a-610j, collectively referred to as 610) of the sentences 602 based on the pairwise comparison of token vectors 606. For example, the pairwise similarity score 610a for sentence 602a and sentence 602b may be 0.50. To calculate the pairwise similarity score 610a, the computer may perform the following computations: (i) count the number of overlapping tokens in the token vectors 606a, 606b corresponding to the sentences 602a, 602b and (ii) divide the number of overlapping tokens by a sum of logarithms of the lengths of the token vectors.

FIG. 6D shows a score table 612 containing scores of illustrative iterative calculation of global importance scores of the sentences 602. In an embodiment, to calculate the global importance scores, the computer may generate a graph in which each node may represent a sentence and where every node may be connected to every other node in the graph. In each connection between the nodes, the edge weight may indicate the degree of similarity between the sentences. For example, an illustrative edge weight may be a pairwise similarity score as shown in the pairwise similarity score matrix 608. Using the graph, the computer in a first iteration may randomly assign a score to each of the sentences. A first row 614a of the score table 612 shows the randomly initialized scores for the sentences 602. The computer may iteratively execute a text rank algorithm as known in the art until the computer reaches a convergence. In other words, the computer, starting from the random initialization may progressively update the score as relationships between sentences are successively evaluated. For example, the computer may compute an initial importance score of the first sentence 602a vis-à-vis a second sentence 602b. The computer may then evaluate a third sentence 602c, and based on the pairwise similarity scores between each of the first sentence 602a and third sentence 602c, and second sentence 602b and the third sentence 602c; and then augment the initial global importance of the first sentence 602a based on this evaluation. The computer may, therefore, begin from an initial assessment of the global importance and continuously update the scores as new information of the similarity scores between the sentences is repeatedly evaluated. The computer may run the iterations until the computer reaches a convergence of the global importance scores. The score table 612 shows a row 614n with the convergence scores.

FIG. 6E shows a score table 616 containing scores of illustrative iterative calculation of local importance score of the sentence 602b of FIG. 6A. The computer may calculate the local importance score executing a similar text rank algorithm to generate global score table as shown in FIG. 6D. The only difference here is that the computer may run the page rank algorithm only for a subset of sentences neighboring sentence 602b.

FIG. 6F shows a score table 620 containing overall or final importance scores of the sentences 602 based on a weighted average of the global importance scores and the local importance scores. For example, a first row 624a may contain the overall importance score of sentence 602a.

FIG. 7A shows a table 700 showing content extracted from a video 702. A computer may extract the contents of the table 700 executing one or more illustrative embodiments disclosed herein. The table 700 may include a first column 704 showing start time and a second column 706 showing end time for a sentence shown in the third column 708. A fourth column 710 may show ranking numbers of the respective sentence shown in the third column. As shown herein, the ranking numbers may be in ascending order, i.e., the highest ranked sentence may have the ranking number of 1. The ranking may be based upon the overall importance scores calculated by the computer using global and local importance scores.

Figure 7B:
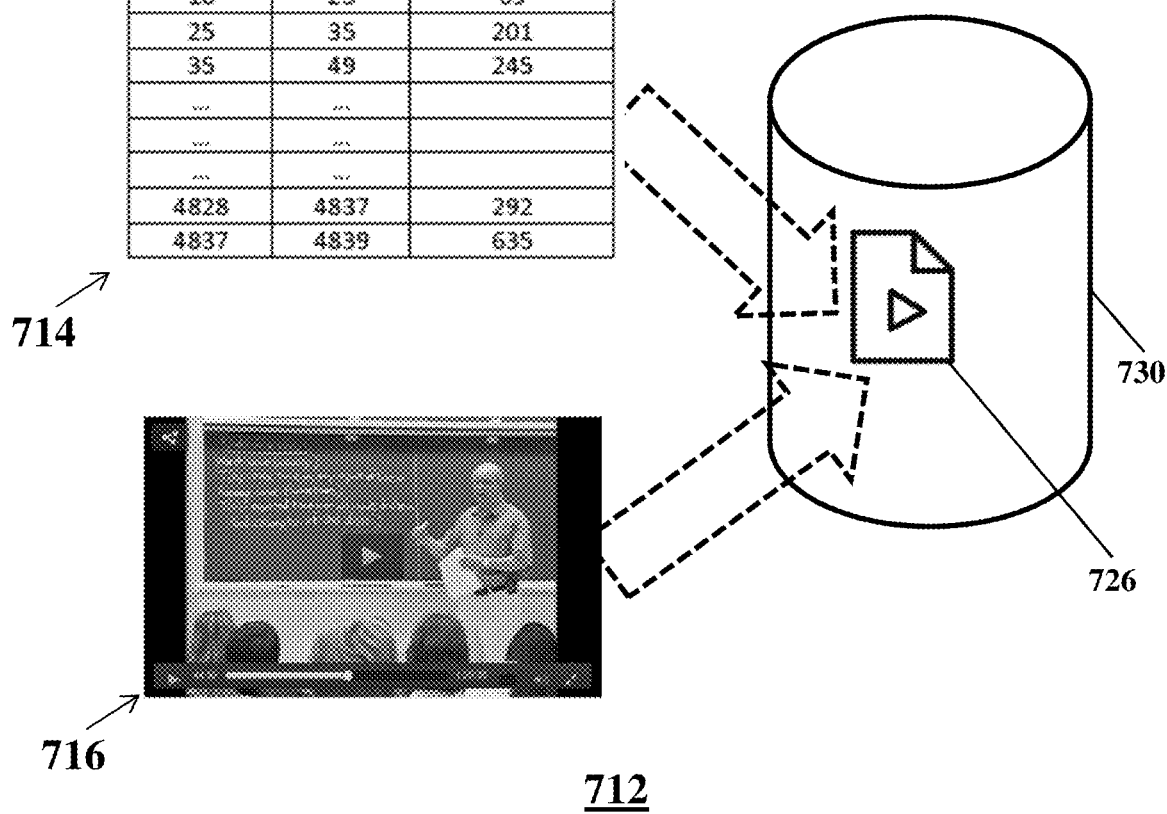
FIG. 7B shows a process diagram of appending metadata to a video file, according to an illustrative embodiment.

FIG. 7B shows an illustrative process diagram 712 for appending or associating metadata 714 to or with a media file 716. As shown the metadata may include timestamps 718 (begin time), 720 (end time) and a rank 724 corresponding to the timestamps 718, 720. In other words, the rank 724 may correspond to the rank of a sentence uttered in the media file 716 in between the timestamps 718, 720. In an embodiment, a computer may append the metadata 714 to the media file 716 to generate an appended media file 726, and store the appended media file 726 to a storage medium 730, such as a hard disk. The appended media file 726 may be a single or multiple data files or records that stores the data of the media file 716 in one format and the metadata 714 in another format. A media player may access the appended media file 726 and extract or otherwise access the metadata 714 to play associated audio of the media file 716 at a normal speed while advancing the media file 716 content at a higher than normal speed.

Figure 8:
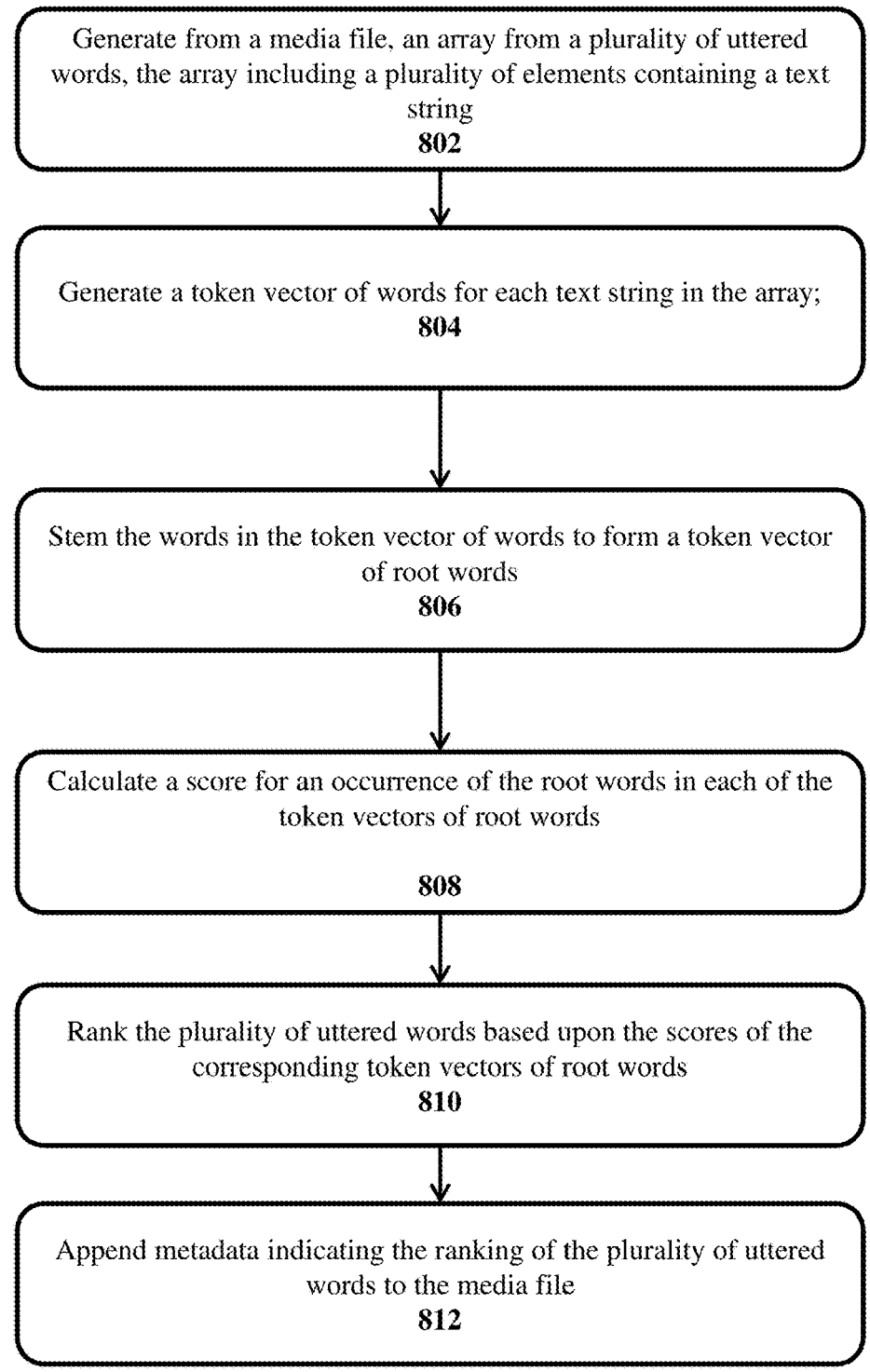
FIG. 8 shows a flow diagram of a method for appending metadata to a media file for playing audio at normal playback speed while advancing the media file content at higher than normal speed, according to an illustrative embodiment.

FIG. 8 shows a flow diagram 800 of an illustrative method of appending metadata to a media file for playback of the audio at the normal playback speed while advancing a portion of the media file content at a higher than normal speed. Although multiple computers, multiple software modules, and multiple databases may implement one or more steps of the method, this description details, for brevity, the steps being implemented by a computer. Furthermore, the steps shown in the flow diagram 800 are merely illustrative, and additional steps or alternative steps should be considered within the scope of this disclosure. Furthermore, one or more of the steps may be skipped during the implementation of the method.

In step 802, the computer may generate from a media file an array from a plurality of uttered words, the array including a plurality of elements containing the text string. In other words, the compute may generate a text from the uttered words in the media file. In step 804, the computer may generate a token vector of words for each text string in the array. In other words, the computer may tokenize the text string in each array to generate word tokens. In step 806, the computer may stem the words in the token vector of words to form a token vector of root word. In step 808, the computer may calculate a score for an occurrence of the root words in each of the token vectors of root words. In step 810, the computer may rank the plurality of uttered words based upon the scores of the corresponding token vectors of root words. In step 812, the computer may append metadata indicating the ranking of the plurality of uttered words to the media file such that a media player plays audio of words having a highest ranking for a portion of the media file over which the media player is playing at a higher speed than a normal playback speed.

Figure 9:
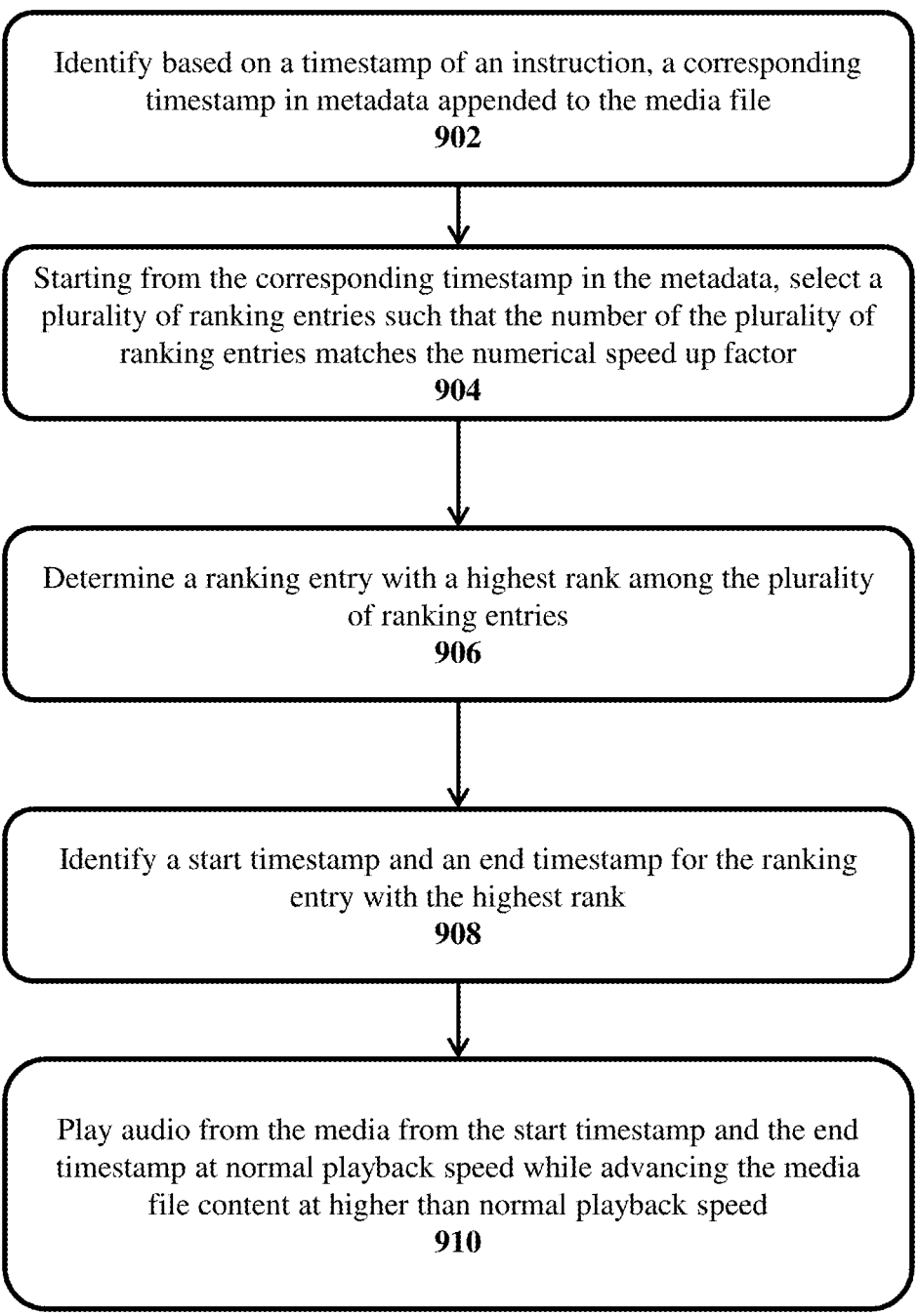
FIG. 9 shows a flow diagram of a method for extracting metadata from a media file for playing audio at normal playback speed while advancing the media file content at higher than normal speed, according to an illustrative embodiment.

FIG. 9 shows a flow diagram 900 of an illustrative method of playing audio from a portion of a media file content while advancing the portion at a higher than normal speed. Although multiple computers and multiple software modules may implement one or more steps of the method, this description details, for brevity, the steps being implemented by a media player.

In step 902, the media player, in response to the media player receiving an instruction to advance a portion of a media file content at higher than normal playback speed by a numerical speed up factor, may identify, based on a timestamp of the instruction, a corresponding timestamp in metadata appended to the media file. In step 904, the media player may, starting from the corresponding timestamp in the metadata, select a plurality of ranking entries such that the number of the plurality of ranking entries matches the numerical speed up factor. In step 906, the media player may determine a ranking entry with a highest rank among the plurality of ranking entries. In step 908, the computer may identify a start timestamp and an end timestamp for the ranking entry with the highest rank. In step 910, the computer may play audio from the media from the start timestamp and the end timestamp at normal playback speed while advancing the media file content at higher than normal playback speed by the numerical speed up factor. The audio played may be audio that is highest ranked over portion(s) of the media file content being advanced. The audio played at normal speed may be entire sentences or portions thereof (e.g., words or phrases determined to be locally or globally important).

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
receiving, by a media player, an instruction to advance media file content at a higher than normal speed, the media file content comprising audio content and video content;
accessing, by the media player, at least a portion of metadata associated with the media file content to retrieve a location of a group of the most important words in a portion of the media file content to be advanced at the higher than normal speed; and
playing, by the media player, audio of the group of the most important words at a normal speed while simultaneously advancing the media file content at the higher than normal speed, based on the instruction.

2. The method of claim 1, wherein the group of the most important words forms a sentence.

3. The method of claim 1, wherein the instruction includes a numerical advancement factor for advancing the media file content at a higher than normal speed.

4. The method of claim 3, further comprising:
identifying, by the media player, based on a timestamp of the instruction, a corresponding timestamp in the metadata;
starting from the corresponding timestamp in the metadata, selecting, by the media player, a plurality of ranking entries such that the plurality of ranking entries match the numerical advancement factor;
determining, by the media player, a ranking entry with a highest rank among the plurality of ranking entries, wherein the ranking entry with the highest rank includes the group of the most important words;
identify, by the media player, a start timestamp and an end timestamp for the ranking entry with the highest rank, wherein the start timestamp and the end timestamp indicate the location of the group of the most important words, and whereby audio content in the media file between the start timestamp and the end timestamp includes the audio of the group of the most important words; and
playing, by the media player, the audio content in the media file from the start timestamp and the end timestamp at the normal speed while advancing the media file content at higher than normal speed by the numerical advancement factor.

5. The method of claim 4, wherein the numeric advancement factor is at least one of 2, 4, 8, 16, and 32 in forward direction or reverse direction.

6. The method of claim 1, wherein the group of the most important words are determined by calculating an importance score based on an occurrence of a plurality of words in the media file content.

7. A system, comprising:
a non-transitory storage medium storing media file content with associated metadata and media player program instructions, the media file content comprising audio content and video content;
a processor in electrical communication with the non-transitory storage medium, and configured to execute the media player program instructions to:
receive an instruction to advance the media file content at a higher than normal speed;
access at least a portion of the associated metadata to retrieve a location of a group of words determined to be the most important in a portion of the media file content to be advanced at the higher than normal speed; and
play audio of the group of the most important words at a normal speed while simultaneously advancing the media file content at the higher than normal speed, based on the instruction.

8. The system of claim 7, wherein the group of the most important words forms a sentence.

9. The system of claim 7, wherein the instruction includes a numerical advancement factor for advancing the media file content at a higher than normal speed.

10. The system of claim 9, wherein the processor is configured to further execute the media player program instructions to:
identify, based on a timestamp of the instruction, a corresponding timestamp in the associated metadata;
starting from the corresponding timestamp in the associated metadata, select a plurality of ranking entries such that the plurality of ranking entries match the numerical advancement factor;
determine a ranking entry with a highest rank among the plurality of ranking entries, wherein the ranking entry with the highest rank includes the group of the most important words;
identify a start timestamp and an end timestamp for the ranking entry with the highest rank, wherein the start timestamp and the end timestamp indicate the location of the group of the most important words, and whereby audio content in the media file between the start timestamp and the end timestamp includes the audio of the group of the most important words; and
play the audio content in the media file from the start timestamp and the end timestamp at the normal speed while advancing the media file content at higher than normal speed by the numerical advancement factor.

11. The system of claim 10, wherein the numeric advancement factor is at least one of 2, 4, 8, 16, and 32 in forward direction or reverse direction.

12. The system of claim 7, wherein the group of the most important words are determined by calculating an importance score based on an occurrence of a plurality of words in the media file content.

13. A computer-implemented method, comprising:
generating, by a computer from media file content comprising audio content and video content, an array from a plurality of uttered words, the array including a plurality of elements containing a text string;
generating, by the computer, a token vector of words for each text string in the array;
stemming, by the computer, the words in the token vector of words to form a token vector of root words;
calculating, by the computer, a score for an occurrence of the root words in each of the token vectors of root words;

ranking, by the computer, the plurality of uttered words based upon the scores of the corresponding token vectors of root words; and associating, by the computer, metadata indicating the ranking of the plurality of uttered words with the media file content such that a media player plays audio of words having a highest ranking for a portion of the media file content over which the media player is simultaneously advancing media file content at a higher speed than a normal speed.

14. The method of claim 13, wherein at least a portion of the plurality of uttered words forms a sentence.

15. The method of claim 13, wherein calculating the score for the occurrence of the root words in each of the token vectors of root words comprises:

calculating, by the computer, pairwise similarity scores for a plurality of pairs of token vectors of root words;

iteratively calculating, by the computer, a global importance score for each token vector of root words based on the pairwise similarity scores for a plurality of pairs of token vectors of root words;

iteratively calculating, by the computer, a local importance score for each token vector of root words based on the pairwise similarity scores of the token vector of root words and set of neighboring token vectors of root words; and calculating, by the computer, a weighted average of the global importance score and the local importance score of each of the token vectors of the root words as the corresponding score.

16. The method of claim 15, wherein calculating pairwise similarity scores for the plurality of pairs of token vectors of root words comprises:

determining, by the computer, a number of overlapping root words between a pair of token vector of root words; and calculating, by the computer, a pairwise similarity score of the pair of token vector of root words by dividing the number of overlapping root words by a sum of logarithms of the lengths of the pair of token vector of root words.

17. The method of claim 15, wherein the number of token vectors of root words in the set of neighboring token vectors of root words is 16.

18. The method of claim 15, wherein the computer weighs the global importance score and the local importance score equally for calculating the weighted average.

19. The method of claim 13, wherein the metadata includes timestamps associated with the plurality of words.

20. The method of claim 13, wherein the media file content is advanced in a forward direction or a reverse direction.

* * * * *